April 27, 1926.
J. P. LÓPEZ ET AL
1,582,338
DINNER PAIL
Filed Sept. 8, 1924
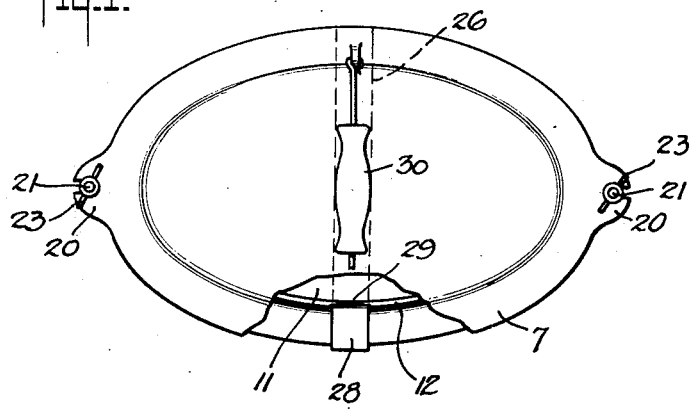
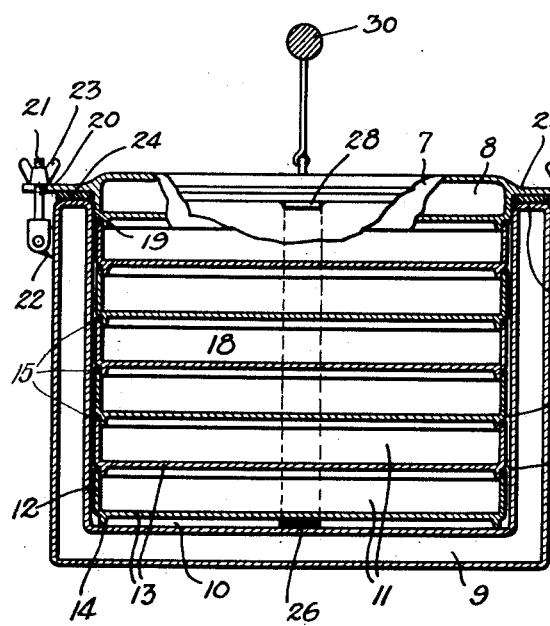
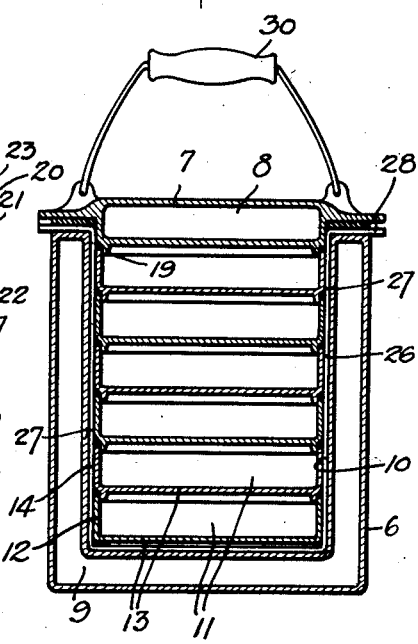
Inventors
JULIUS P. LÓPEZ
WILLIAM L. WARD
By Munn &Co.
Attorneys Patented Apr. 27, 1926.

1,582,338

UNITED STATES PATENT OFFICE.

JULIUS PEREZ LÓPEZ AND WILLIAM L. WARD, OF LOS ANGELES, CALIFORNIA.

DINNER PAIL.

Application filed September 8, 1924. Serial No. 736,541.

*To all whom it may concern:*

Be it known that we, JULIUS P. LÓPEZ, a citizen of Mexico, and WILLIAM L. WARD, a citizen of the United States, both residents of Los Angeles, in the county of Los Angeles and State of California, have invented certain new and useful Improvements in Dinner Pails, of which the following is a specification.

This invention relates to dinner pails, and has for its primary object the provision of a vessel wherein different articles of food may be stored and maintained at a warm temperature throughout an interval represented approximately by the time when the food is placed in the device and a time when it is taken out of the device for consumption.

A further object of the invention is to provide means for hermetically sealing the respective foods from each other and for preventing contamination of the foods when the device is in transport.

A further object of the invention is to provide means for holding previously heated foods at a high temperature in a heat retaining chamber and for effectively excluding atmospheric air to said chamber while simultaneously subdividing the chamber and hermetically sealing the sub-divided portions of the said chamber.

Another object of the invention is to provide a device of this character having means for separating different articles of food from each other and for simplifying the operation of initially arranging the articles in the heat preserving chamber of the device and subsequently removing same therefrom.

A still further object of the invention is to provide a device of this character embracing an arrangement and construction of parts that can be conveniently cleaned and maintained in a sanitary condition.

Another object of the invention is to provide a device of this character which shall be light of weight, strong and durable and compact.

A still further object of the invention is to provide a pail having a heat preserving chamber of suitable depth, and a plurality of identical trays subdividing said chamber and means for sealing the chamber and the joints between the respective trays to augment the heat insulating qualities of the structure.

In the drawings—

Figure 1 is a plan view of the pail with parts broken away for the sake of clearness; Figure 2 is a vertical longitudinal section therethrough; and Figure 3 is a transverse section therethrough.

In carrying the invention into practice, use is made of a vessel 5 consisting of relatively separable sections 6 and 7, the latter being in the form of a closure and provided with double walls so as to provide a heat insulating dead air space 8. The section 6 is correspondingly formed of double walls so as to provide a dead air space 9. While we prefer two dead air spaces, it shall be understood that dead air is used as an insulation and that mineral wool, asbestos or the like may be substituted therefor. Likewise, we may use a so-called vacuum space and in such instance the two sections 6 and 7 of the vessel will be provided with the customary well known means for extracting air from the spaces between the walls thereof.

The two sections 6 and 7, when joined together as shown in Figures 2 and 3, define a preserving space or chamber 10, and arranged in said chamber are superimposed trays 11 of identical construction. Each of these trays is open at its top and provided with vertical boundary walls 12, a bottom 13 and a depending base flange 14 which extends entirely around the bottom at a point slightly inwardly of a line drawn vertically through the boundary walls. This permits the flange 14 of one tray to nest into the next adjacent tray as illustrated. By offsetting the flange 14 of each tray with respect to the aforesaid boundary walls, a shoulder 16 is formed at the joinder of the flange with said boundary walls, and placed around said shoulder is a sealing gasket 15.

The trays are proportioned so that when placed in the heat retaining chamber 10 they occupy the whole of said chamber with respect to the depth thereof, the top tray terminating slightly below the connecting wall 17 between the inner and outer walls of the section 6. The purpose of this construction will appear presently. So far, I have described an arrangement and combination of parts wherein trays are arranged superimposed in a heat retaining chamber and incident to the provision of the gaskets 15 between the respective trays, it will be appreciated that the trays are arranged relatively yieldable in a longitudinal direction or when downward pressure is applied to the top tray. This permits of a compensating action between the trays so that one firmly seats against another, and it further serves to hermetically seal the food compartments 18 defined by the walls of adjacent trays.

The top section 7 is provided with a depending flange 19 adapted to fit into the top tray and, as illustrated, the flange is embraced by a gasket adapted to be brought into effective impingement with the boundary walls of said top tray. This seals the space between the top trays and the cover section. The cover section is provided with bifurcated ears 20—20 adapted to receive swinging clamping bolts 21 mounted on ears 22 on the section 6 near the upper end thereof. The bolts may be swung into the bifurcations of the ears and the nuts 23 of the bolts brought forcibly against the upper surfaces of the ears. When the nuts are rotated in one direction pressure is applied to the section 8 so as to exert stress in a downward direction against all of the mating superimposed trays and advance the gaskets 15 into operative sealed relation to the respective trays. In order that the chamber 10 may be simultaneously sealed when yieldingly bringing the trays into contact as previously set forth, we provide an elastic gasket 24 between the wall 17 of the section 6 and the marginal flange 25 of the closure section 7.

In order to facilitate operation of placing the respective food containing trays in the chamber 10 or removing them therefrom, we provide an elevating strap 26 of U-shaped construction which acts as a saddle for all of the trays, as shown in figures 2 and 3. The sides 27—27 of the strap extend to the top of the section 6, and at this point they are offset at 28 where they may be manipulated by two hands of an operator. The sides 27—27 of the strap preferably fit in receiving recesses 29 formed in the sides of the respective trays. These recesses are adapted to coincide with one another when the trays are operatively superimposed.

In using the device, hot liquid beverages may be placed in the two lower trays. heated article of food may be placed in the upper trays. It shall be understood that the articles of food, when placed in their respective trays, are at such normal temperatures as would be suitable for their ordinary consumption. The trays are then placed one on top of another and arranged in the saddle forming strap 26. The trays are then lowered into the chamber 10 so that the bottom tray rests on the inner bottom wall of the section 6. The cover section is then adjusted to position and clamped down against the gasket 24. This simultaneously seals the joint between the two sections 6 and 7 and hermetically seals the joint between the sections of the respective trays. In this manner the method employed for conserving heat is greatly augmented and, in practice, it is found that previously heated articles of food may be maintained at almost their normal temperature for many hours, at least through such space of time as is represented by the interval between the placing of the articles in the chamber 10 and the removal of same for consumption, it being understood that the pail is primarily intended for use by workingmen who may desire to use the articles of food within five or six hours from the time the pail is filled.

We claim:

1. A dinner pail comprising mating sections, a yieldable gasket interposed between the sections, means for drawing the sections together to cause their impingement with the gasket, and identical trays interposed between the sections and arranged one above another and coacting with said sections so that in drawing the sections together the spaces between the respective trays will be hermetically sealed, the gasket serving to permit the trays to compensate themselves to adjustments of the sections.

2. A dinner pail comprising two hollow walled receptacle sections, one fitting partly within the other and having a flange extending over the upper edge of said other section, a yieldable gasket between the flange and said upper edge of the other section, means for drawing the sections together against the gasket to permit the spaces between the hollow walls of both sections to properly function to define and act as dead air spaces, and a series of identical trays wholly occupying the space between both sections, said trays being nested together and held in relatively tight and sealed contact with each other by the action of the drawing means when advancing the receptacle sections against said gasket.

JULIUS PEREZ LÓPEZ.
WILLIAM L. WARD.